(12) United States Patent
Kacavenda

(10) Patent No.: US 9,377,633 B2
(45) Date of Patent: Jun. 28, 2016

(54) RESILIENT HINGE FOR SPECTACLES

(71) Applicant: SAFILO SOCIETA AZIONARIA FABBRICA ITALIANA LAVORAZIONE OCCHIALI S.P.A., Pieve di Cadore (IT)

(72) Inventor: Milan Kacavenda, Banja Luka (BA)

(73) Assignee: SAFILO SOCIETA AZIONARIA FABBRICA ITALIANA LAVORAZIONE OCCHIALI S.P.A., Pieve di Cadore (IL)

( * ) Notice: Subject to any disclaimer, the term of this patent is extended or adjusted under 35 U.S.C. 154(b) by 0 days.

(21) Appl. No.: 14/379,317

(22) PCT Filed: Feb. 26, 2013

(86) PCT No.: PCT/IB2013/051538
§ 371 (c)(1),
(2) Date: Aug. 18, 2014

(87) PCT Pub. No.: WO2013/128374
PCT Pub. Date: Sep. 6, 2013

(65) Prior Publication Data
US 2015/0009471 A1 Jan. 8, 2015

(30) Foreign Application Priority Data

Mar. 2, 2012 (BA) .............................. BAP122889A

(51) Int. Cl.
*G02C 5/22* (2006.01)
*G02C 5/14* (2006.01)
*G02C 5/16* (2006.01)

(52) U.S. Cl.
CPC ................ *G02C 5/2254* (2013.01); *G02C 5/14* (2013.01); *G02C 5/16* (2013.01); *G02C 5/22* (2013.01); *G02C 5/2209* (2013.01)

(58) Field of Classification Search
CPC .......... G02C 5/2209; G02C 5/22; G02C 5/16; G02C 5/14; Y10T 16/526
USPC .......................................... 351/114, 153, 121
See application file for complete search history.

(56) References Cited

U.S. PATENT DOCUMENTS

| | | | | |
|---|---|---|---|---|
| 3,145,254 A | * | 8/1964 | McCulloch | G02C 5/10 16/228 |
| 4,605,293 A | * | 8/1986 | Blumenthal | G02C 5/008 16/228 |
| 5,963,296 A | * | 10/1999 | Matera | G02C 5/2209 351/113 |
| 6,438,798 B1 | * | 8/2002 | Chene | G02C 5/2254 16/284 |

FOREIGN PATENT DOCUMENTS

FR 2 952 443 A1 5/2011

OTHER PUBLICATIONS

International Search Report and Written Opinion for PCT/IB2013/051538 mailed May 22, 2013.

\* cited by examiner

*Primary Examiner* — Thomas K Pham
*Assistant Examiner* — Mitchell Oestreich
(74) *Attorney, Agent, or Firm* — RatnerPrestia

(57) ABSTRACT

A resilient hinge device for connecting each of the arms to a front frame of spectacles in an articulated way, includes a tie bar having an axial extremity articulated with the arm and a resilient member including a substantially U-shaped sheet metal body, the resilient member being fitted onto the tie bar in such a way as to remain placed between the front frame and the arm to resiliently stress the arm towards preselected angular positions with respect to the front frame when the arm is rotated, these angular positions including a position in which the arm is open, suitable for wearing of the spectacles, and a closed position of the arm folded back against the front frame, and to return the arm to the open position when rotated beyond that position when opened too far with respect to the frame.

7 Claims, 4 Drawing Sheets

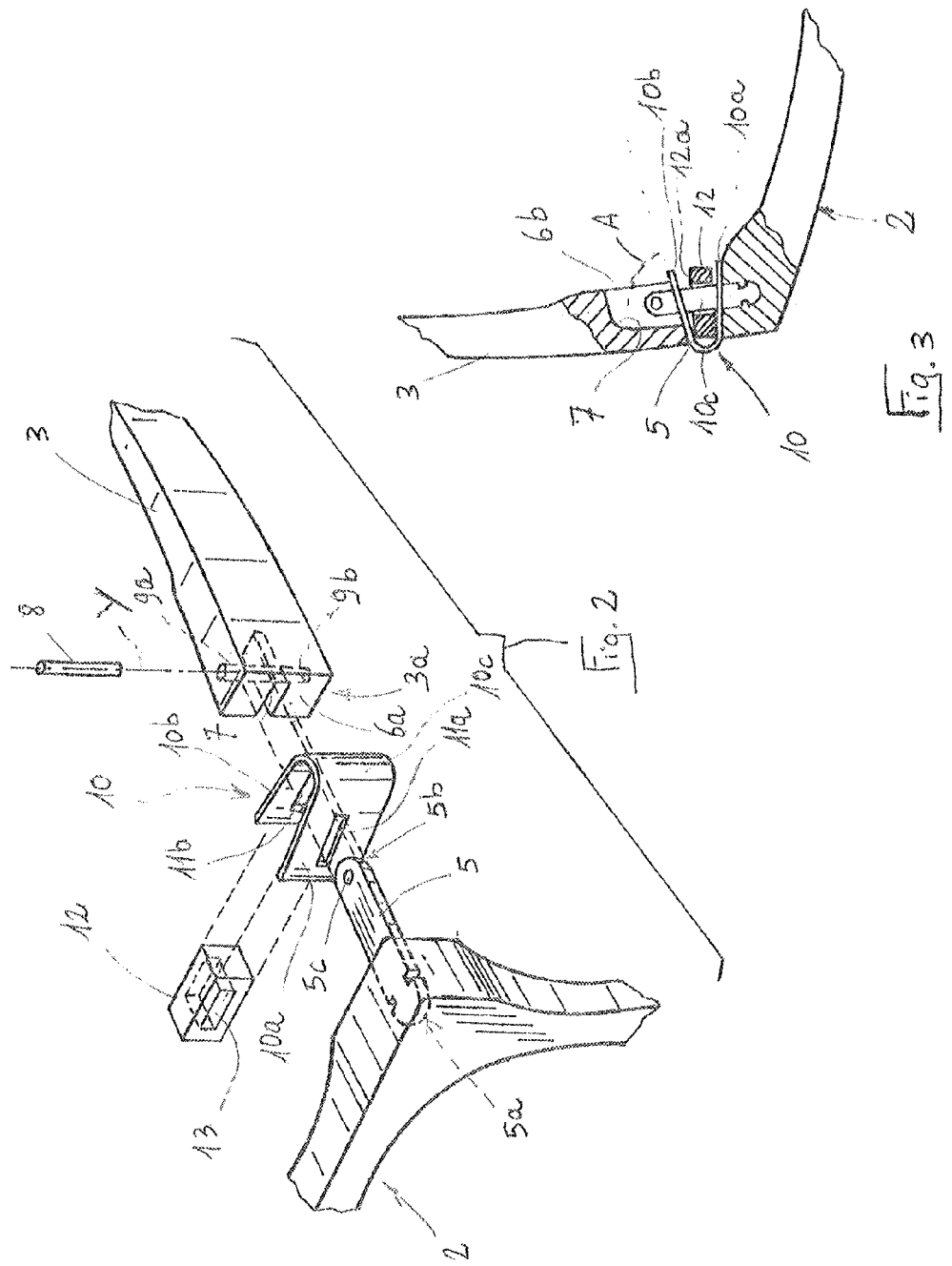

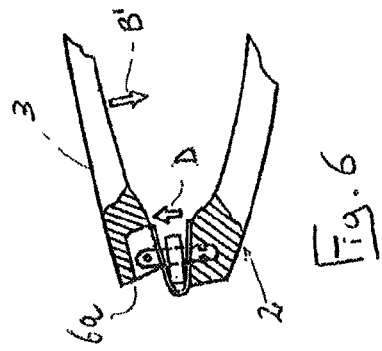
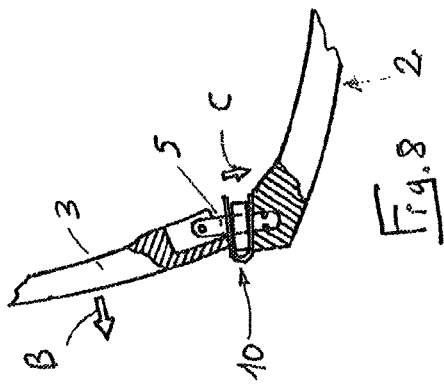
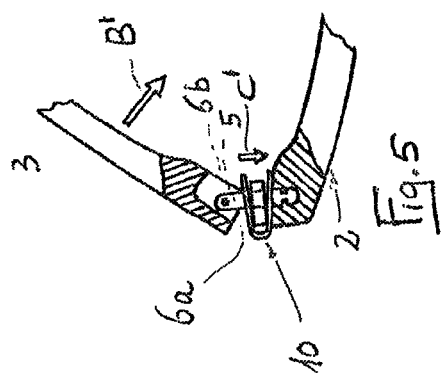
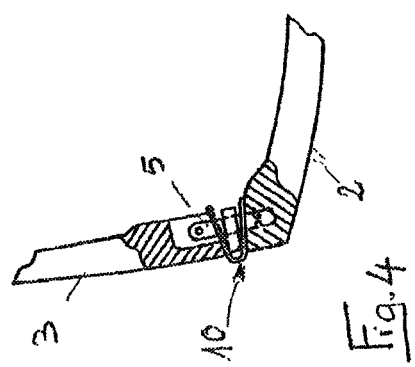
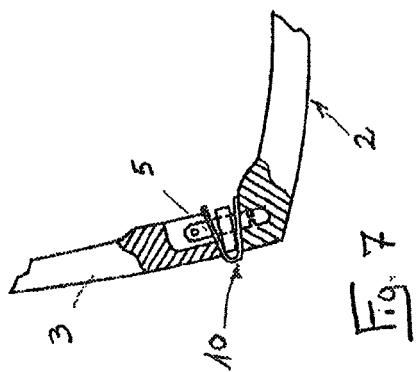

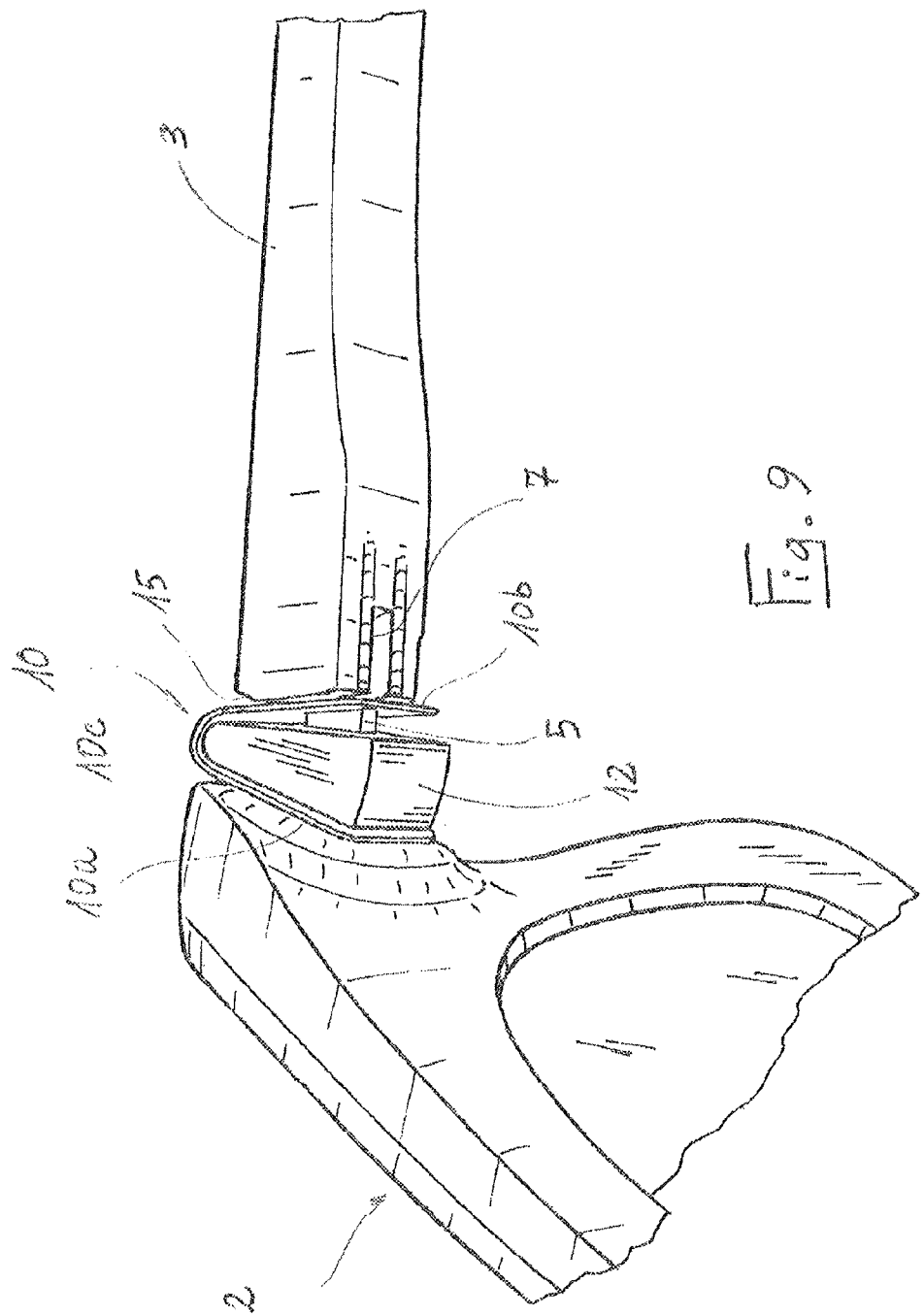

RESILIENT HINGE FOR SPECTACLES

CROSS REFERENCE TO RELATED APPLICATIONS

This application is the U.S. National Phase Application of PCT/IB2013/051538, filed Feb. 26, 2013, which claims priority to Bosnia and Herzegovina Application No. BAP122889A, filed Mar. 2, 2012, the contents of such applications being incorporated by reference herein.

TECHNICAL SCOPE

This invention relates to a resilient hinge device for connecting each of the arms to a front frame of spectacles in an articulated way.

STATE OF THE ART

In the technical context to which this invention relates resilient hinge devices to hinge the arms to the front frame of spectacles, also identified in the technical language by the term "flex" hinges, in which a spring mechanism enables the arm to return resiliently to preferred angular positions, are known.

In a known type provision is made for the spring mechanism to be mounted on the spectacles' arm, and this gives rise to problems with the use of materials which make welding impossible or difficult when manufacturing the arm. Materials containing carbon, titanium, wood fibre materials or plastics materials, which give rise to obvious technological difficulties when fitting the spring mechanism to the arm, may be mentioned by way of example.

In the case of plastics arms a typical solution provides for heating the mechanism and inserting it into the plastic part of the arm. In other solutions the mechanism is welded directly to the arm and the remaining part of the arm is subsequently cut off to obtain the correct distance between the centre of rotation of the mechanism and the front part of the arm. Solutions are also known in which provision is made for a type of resilient mechanism made using the material of the arm, with this being adhesive bonded to the arm. Such a solution has not proved to be particularly effective, especially when resilient mechanisms are used on materials which cannot easily be melted or welded.

Resilient hinge mechanisms of the flex type also provide for the use of metal materials in sheet form, for example small metal plates, which have not however proved to be suitably acceptable, not least from the aesthetic point of view, and in known solutions these have also failed to provide sufficient force when fitted to cut plastic arms of different and larger sizes.

SUMMARY OF THE INVENTION

An aspect of this invention provides a hinge device that is structurally and functionally designed to overcome the limitations pointed out with reference to the cited known art, which can be easily fitted to arms through simplified construction even when manufactured from materials that are difficult to weld or that can in fact be welded, while at the same time ensuring that the assembly is aesthetically satisfactory, even though the hinge device remains largely visible in the assembly. Another object is that of providing a resilient hinge with an effective stop mechanism at preselected angular positions.

These and other aspects which will be clearly apparent below are accomplished by the invention through a hinge device constructed in accordance with the appended claims.

BRIEF DESCRIPTION OF THE DRAWINGS

Further characteristics and advantages of the invention will be more apparent from the following detailed description of a preferred embodiment illustrated indicatively and without limitation with reference to the appended drawings in which:

FIG. 2 is an exploded perspective view in partial cross-section and on a magnified scale of one of the resilient hinge devices in the frame in FIG. 1, FIG. 3 is a view in partial cross-section of a detail of the resilient hinge device in the preceding figures, FIGS. 4, 5 and 6 are views corresponding to that in FIG. 3 which illustrate a first rotation sequence of the arm with respect to the frame, FIGS. 7 and 8 are views corresponding to that in FIG. 3 of a second and different rotation sequence of the arm, FIG. 9 is a perspective view in partial cross-section of a frame comprising resilient hinge devices with details representing a variant construction in comparison with the preceding figures.

PREFERRED MANNER OF IMPLEMENTING THE INVENTION

Figure 1:
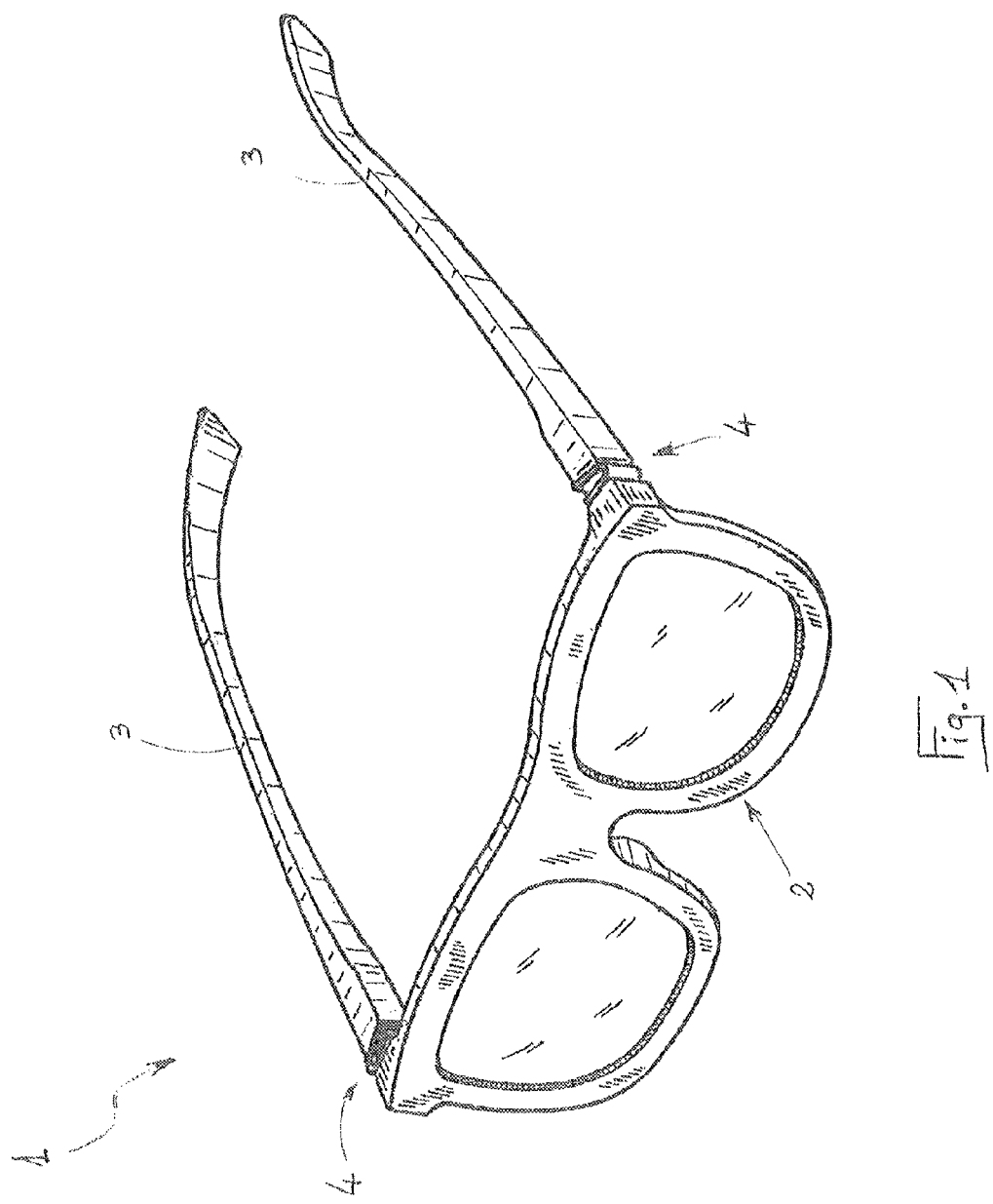
FIG. 1 is a perspective view of a spectacle frame including resilient hinge devices constructed in accordance with the invention.

With reference to the figures mentioned, 1 indicates spectacles as a whole, diagrammatically illustrated in FIG. 1, comprising a front frame 2, a pair of side arms 3, and for each arm a corresponding resilient hinge device 4 to hinge the corresponding arm to the frame, constructed in accordance with this invention. Only one of hinge devices 4 will be described, because they are structurally identical.

The device comprises a tie bar 5 extending predominantly longitudinally between opposing axial extremities 5a, 5b. The tie bar is attached to front frame 2 through extremity 5a, for example by immobilising the extremity portion in a seat provided in the front frame, and extends from the attachment portion to the front frame in a direction substantially corresponding to the longitudinal direction adopted by arm 3 when this is in the open position with respect to the frame, as clearly illustrated in FIG. 1. The opposite end 5b of the tie bar is hinged to a corresponding extremity portion 3a of the arm facing front frame 2 around a hinge axis indicated by Y.

In the end portion 3a of the arm there is a front surface 6a which faces front frame 2 when the arm is in the open position, and a side surface 6b which faces the inside of the frame, which therefore faces front frame 2 when arm 3 moved into the closed position folded against the front frame.

In order to hinge arm 3 it is provided that extremity 5b of the tie bar, provided with a through hole 5c, is seated in a seat 7 located centrally in the end portion 3a of the arm. A screw pin 8 mounted on the arm engages hole 5c in rotatable attachment and engages a pair of holes 9a, 9b which are coaxial with hinge axis Y and hole 5c, which are made in the end portion 3a of the arm, on sides opposite seat 7, as clearly illustrated in FIG. 2. An engaging thread between the screw pin and at least one of holes 9a, 9b is provided to immobilise screw 8.

Extremity 5b of the tie bar is also housed in seat 7 without any interference with its relative free rotation, and with limited coupling play in the direction of the hinge axis Y.

In greater detail, seat 7 is open at both front surface 6a of arm 3 and adjacent side surface 6b. These openings allow arm 3 to be rotated about hinge axis Y between open and closed positions and into a position in which the arm is opened wider.

Device 4 also comprises a resilient member 10 including a substantially U-shaped sheet metal member with a pair of opposite surface portions 10a, 10b facing each other and connected by an end portion 10c. Resilient member 10 is designed to generate a resilient returning force to the undeformed condition when portions 10a, 10 are resiliently stressed, in particular against each other. Said member 10 also has a corresponding through hole 11a, 11b in each of its portions 10a, 10b, these openings being of suitable size to fit resilient member 10 on tie bar 5 through slideably inserting the tie bar through the holes so that resilient member 10 remains located between front frame 2 and the end portion of arm 3a hinged to tie bar 5. In the assembly stage it is provided that the body of resilient member 10 is mounted on the tie bar from extremity 5b of the latter and subsequently this extremity is hinged to arm 3 by fitting screw pin 8 into the corresponding holes. Resilient member 10 is mounted in device 4 with the end portion connecting portions 10a, 10b remaining visible from outside the assembly.

When arm 3 is fitted it is also conveniently pressed against resilient member 10 with moderate loading in such a way that once screw pin 8 has been fitted a moderate condition of resilient stress is set up (between the front frame and the arm) sufficient to hold arm 3 stably on the frame in the open position without any coupling play.

In this position surface portion 10a of resilient member 10 is in supporting contact against front frame 2 and the other portion 10b is in contact with front surface 6a of arm 3.

It should be noted that in order to ensure the positional stability of arm 3 in the open position it is provided that the front surface 6a of the end of the arm has a predetermined angle (angle A in FIG. 3) with respect to the longitudinal direction of the arm and this angle is selected correspondingly to the angle of surface portion 10b of resilient member 10 with respect to the longitudinal direction. This choice is decisive for ensuring that the arm will be in a stable condition in the open position (FIG. 4).

Resilient member 10 thus performs the function of resiliently pushing arm 3 towards various preselected angular positions in relation to front frame 2 when the arm is rotated about hinge axis Y, these angular positions including the open position, suitable for wearing the spectacles, mentioned above (FIG. 4), the closed position in which the arm is folded against the front frame (FIG. 6), and the function of returning arm 3 to the open position when rotated beyond that position when opened too far with respect to the frame (FIG. 8).

12 indicates a stop member located between portions 10a, 10b of resilient member 10, this stop member having a through hole 13 which houses tie bar 5 with play when stop member 12 is fitted to the tie bar together with member 10. As a result of this assembly stop member 12 is held between surface portions 10a, 10b in order mainly to perform the function of means for limiting elastic deformation of portion 10b in relation to portion 10a, deformation induced on the resilient member by the arm when the arm is rotated about the hinge axis, as will be clearly apparent below. Preferably stop member 12 has a shape which is suitable for predominantly occupying the internal space delimited by surface portions 10a, 10b of the U-shaped resilient member, with at least limited coupling play, so as to permit the resilient member to deform when stressed by the rotated arm, but suitable for limiting displacement of portion 10b due to elastic deformation up to the condition where the latter is in contact with surface 12a of stop member 12 and faces the latter with consequent arrest of the movement of portion 10b.

Starting from the position in which the arm is open, shown in FIG. 7, further opening movement of arm 3 (through rotation about the hinge axis in an anti-clockwise direction, shown by arrow B in FIG. 8) causes resilient member 10 to be compressed because of relative contact between the front surface of the arm and portion 10b (movement in the direction of arrow C in FIG. 8). Deformation of the latter is limited by stop member 12 on reaching the position in FIG. 8 in which portion 10b is substantially in supporting contact against surface 12a of member 12. This condition determines the maximum permitted angle of additional opening of arm 3.

Subsequent release of arm 3 allows stressed member 10 to react resiliently to return to its undeformed condition to rotate the arm again towards the open position in FIG. 7.

As the arm moves from the open position in FIG. 4 to the closed position in FIG. 6 following rotation of the arm (in the clockwise direction in FIG. 5—arrow B') the resilient member is initially deformed elastically by contact between front surface 6a of the arm and portion 10b of the resilient body (in the direction of arrow C' in FIG. 5), to a configuration where the arm is open at approximately 45° with respect to the front frame. Further rotation of the arm displaces the point of contact between the arm and the resilient member releasing the resilient reaction of member 10 (movement in the direction of arrow D in FIG. 6) reaching the closed position in which the internal side surface 6b of the arm is in supporting contact with the surface portion 10b of the resilient body, ensuring adequate positioning stability in this condition.

Vice-versa, as the arm makes an opening movement overcoming the intermediate configuration in FIG. 5 the resilient stress induced by the arm on member 10 is such as to return the arm to the stable open position illustrated in FIG. 4.

In a variant embodiment illustrated in FIG. 9 it is provided that stop member 12 adopts a wedge-shaped configuration instead of a solid rectangular configuration (FIG. 2) suitable for being received, with approximately substantial shape matching, apart from limited play, within the internal volume defined between surface portions 10a, 10b of member 10.

With reference to this variant it is also provided that front surface 6a of end 3a of the arm has a gap 15 at the corner of end portion 3a facing the outside of the assembly. This gap is defined by a length of surface of predetermined inclination with respect to surface 6a configured to give rise to a contact zone between the arm and surface portion 10b of the resilient member when the arm is moved beyond the open position.

The invention thus accomplishes the proposed objects and provides numerous advantages in comparison with known solutions.

One main advantage lies in the structural simplification of the resilient hinge device according to the invention, which is designed not to require special working or attachment by welding to the arm, thus allowing an extensive range of materials to be used to manufacture the arm, including materials which are difficult to weld or which can in fact be welded. Also no attachment or stop with insertion of components of the hinge in seats made in the arm itself is required. The device according to the invention also advantageously makes it possible to predetermine the distance between the centre of rotation and the points of contact between the resilient member and the arm, thus making it easier to position the components and assemble them.

Another advantage is that in addition to structural simplification of the components of the resilient hinge and easier assembly thereof, the invention makes it possible to achieve a satisfactory aesthetic result even though the components of the resilient hinge are left visible in the assembly.

The invention claimed is:

1. A resilient hinge device for connecting each arm to a front frame of spectacles in an articulated way, comprising:
   a tie bar, one extremity of which is attached to the front frame and stands erect from the front frame in a direction in which the arm is axially or longitudinally extended in its open position with respect to the front frame, an opposite axial extremity of the tie bar being articulated to an end portion of the arm facing the front frame about a hinge axis,
   a resilient member including a body of substantially U-shaped sheet metal with a pair of opposite surface portions facing each other and each extending from a central portion of the resilient member, the resilient member being fitted onto the tie bar through through-openings made in each of the surface portions of that body so that it remains located between the front frame and the end portion of the arm articulated to the tie bar, and
   a stop member located between the mutually-facing surface portions of the resilient member, the stop member having a through hole housing the tie bar, such that the stop member is held between the surface portions of the resilient member, and acts as means restricting the resilient deformation induced by the arm in the resilient member when the arm is rotated about the hinge axis, wherein
   one of the surface portions of the resilient member is in supporting contact against the front frame and the other surface portion of the resilient member is in contact with the end portion of the arm to resiliently stress the arm towards preselected angular positions with respect to the front frame when the arm is rotated about the hinge axis, these angular positions including a position in which the arm is open, suitable for wearing of the spectacles, and a closed position of the arm folded back against the front frame and to return the arm to the open position when rotated beyond that position when opened too far with respect to the frame.

2. A device according to claim 1, wherein the stop member has a shape so as to predominantly occupy a space bounded by the surface portions of the resilient member, with at least limited coupling play, so as to permit deformation of the resilient member when stressed by the arm as it is rotated about the hinge axis.

3. A device according to claim 1, wherein the end of the tie bar hinged to the arm is housed in a seat provided centrally in the end portion of the arm, with limited coupling play in the direction of the hinge axis, the tie bar having a through hole at one of its extremities housed in the seat in the arm, with a screw-pin mounted on the arm being rotatably housed in the hole and capable of engaging holes provided thereon corresponding to the seat, the extremity of the tie bar articulated to the arm being rotatably housed in the seat without interfering with relative free rotation about the hinge axis.

4. A device according to claim 3, in which the seat opens onto a front surface of the end portion of the arm and onto a contiguous side surface of the arm folded back against the inside of the front frame.

5. A device according to claim 4, in which the front surface of the end portion of the arm is designed to be in supporting contact with the corresponding surface portion of the resilient member has a predetermined angle with respect to the direction in which the arm is axially or longitudinally extended and is selected in such a way as to ensure that positioning of the arm is stable when the latter is moved to the open position with the most extensive supporting contact between the arm and the resilient member.

6. Spectacles comprising a front frame designed to house corresponding lenses and a pair of side arms articulated to the front frame by corresponding resilient hinge devices constructed in accordance with claim 1.

7. A resilient hinge device for connecting each arm to a front frame of spectacles in an articulated way, comprising:
   a tie bar, one extremity of which is attached to the front frame and stands erect from the front frame in a direction in which the arm is extended in its open position with respect to the front frame, an opposite axial extremity of the tie bar being articulated to an end portion of the arm facing the front frame about a hinge axis;
   a resilient member including a body of substantially U-shaped sheet metal with a pair of opposite surface portions facing each other and each extending from a central portion of the resilient member, the resilient member being fitted onto the tie bar through through-openings made in each of the surface portions of that body so that it remains located between the front frame and the end portion of the arm articulated to the tie bar; and
   a stop member located between the mutually-facing surface portions of the resilient member, the stop member having a through hole housing the tie bar, such that the stop member is held between the surface portions of the resilient member, and restricts the resilient deformation induced by the arm in the resilient member when the arm is rotated about the hinge axis,
   wherein one of the surface portions of the resilient member is in supporting contact against the front frame and the other surface portion of the resilient member is in contact with the end portion of the arm to resiliently stress the arm towards preselected angular positions with respect to the front frame when the arm is rotated about the hinge axis, these angular positions including a position in which the arm is open, suitable for wearing of the spectacles, and a closed position of the arm folded back against the front frame and to return the arm to the open position when rotated beyond that position when opened too far with respect to the frame, and
   wherein the stop member has a shape so as to predominantly occupy a space bounded by the surface portions of the resilient member, with at least limited coupling play, so as to permit deformation of the resilient member when stressed by the arm as it is rotated about the hinge axis.

* * * * *